(12) United States Patent
Trela

(10) Patent No.: US 12,369,607 B2
(45) Date of Patent: Jul. 29, 2025

(54) CONTROLLING PRODUCTION OF $H_2S$ IN BEVERAGES FOR PACKING IN ALUMINUM CONTAINING PACKAGES

(71) Applicant: Ball Corporation, Westminster, CO (US)

(72) Inventor: Brent C. Trela, Superior, CO (US)

(73) Assignee: BALL COPORATION, Westminster, CO (US)

( * ) Notice: Subject to any disclaimer, the term of this patent is extended or adjusted under 35 U.S.C. 154(b) by 790 days.

(21) Appl. No.: 17/299,487

(22) PCT Filed: Dec. 3, 2019

(86) PCT No.: PCT/US2019/064178
§ 371 (c)(1),
(2) Date: Jun. 3, 2021

(87) PCT Pub. No.: WO2020/117765
PCT Pub. Date: Jun. 11, 2020

(65) Prior Publication Data
US 2022/0046959 A1 Feb. 17, 2022

Related U.S. Application Data

(60) Provisional application No. 62/774,642, filed on Dec. 3, 2018.

(51) Int. Cl.
*A23L 2/54* (2006.01)
*A23L 2/38* (2021.01)
(Continued)

(52) U.S. Cl.
CPC .............. *A23L 2/54* (2013.01); *A23L 2/382* (2013.01); *A23L 2/70* (2013.01); *B65D 25/14* (2013.01)

(58) Field of Classification Search
CPC ... A23L 2/382; A23L 2/54; A23L 2/70; C12H 1/22; C12H 1/14; B65D 17/4012; B65D 25/14
See application file for complete search history.

(56) References Cited

U.S. PATENT DOCUMENTS

2008/0254164 A1  10/2008  Stokes et al.
2015/0322391 A1  11/2015  Stokes et al.
(Continued)

FOREIGN PATENT DOCUMENTS

EP  1429968 B1  4/2006
WO  2006105610 A1  10/2006

OTHER PUBLICATIONS

Gambuti et al (Oxygen's Impact on Red Wine Aging) Feature Article from the Dec. 2016 Magazine Issue https://winebusinessanalytics.com/sections/printout_article.cfm?article=feature&content=177198# (Year: 2016).*

(Continued)

*Primary Examiner* — Vera Stulii
(74) *Attorney, Agent, or Firm* — Greer, Burns & Crain, Ltd.

(57) ABSTRACT

Packaging a fermented beverage in an aluminum-bearing or containing vessel includes controlling a concentration of sulfur dioxide within the fermented beverage. The concentration of the sulfur dioxide is decreased by subjecting the fermented beverage to a chemical process in batch or in-line and prior to filling the vessel or after filling the vessel.

22 Claims, 2 Drawing Sheets

(51) Int. Cl.
    *A23L 2/70*       (2006.01)
    *B65D 25/14*    (2006.01)

(56) References Cited

U.S. PATENT DOCUMENTS

2016/0096655 A1    4/2016   Stokes et al.
2018/0208883 A1    7/2018   Corcoran

OTHER PUBLICATIONS

Gusmer Enterprises, "Calculating Molecular SO2" Wine Products Catalog, 2005, 2 pages.
P. Lopes, et al., "Impact of Oxygen Dissolved at Bottling and Transmitted Through Closures on the Composition and Sensory Properties of a Sauvignon Blanc Wine During Bottle Storage" Journal of Agricultural and Food Chemistry, vol. 57, No. 21, 2009.
I. Lazur, "Effect of pH on Coatings Used to Protect Aluminum Beverage Cans" Carleton University, Ottawa, Ontario, 2014.
L. J. Woodward, "Wine Packaging: Alternatives to Traditional Glass" 2010.
European Search Report; priority document.
A.L. Waterhouse, "Wine Phenolics" Annals of the New York Academy of Sciences, New York Academy of Science, vol. 957, No. 1, 2002.
P. Shea, et al., "The Measurement of Total Oxygen in Filled BIB Wine" Performance BIB—Wine Packaging Seminars: Environmental Impact & O2 Measurements, Bordeaux, France, Nov. 29, 2010.
T. E. Steiner, "Sources in the Bottling Line Operation Responsible for Dissolved Oxygen Entry in Wine" Department of Horticulture and Crop Science, The Ohio Statement University/OARDC.
M. A. Amerine, Ph.D., et al., "The Technology of Wine Making" The Avi Publishing Company, Inc. Westport, Connecticut, 1972.
Australian Wine Research Institute, "Annual Wine Report: 56th Annual Report, Jun. 30, 2010".
B. Zoecklein, "Enology Notes: vol. 97, Jun. 13, 2005" Wine/Enology—Grape Chemistry Group, Virginia Tech.
A. Blake, "The Impact of Wine Closure and Packaging Type, and Light and Temperature Exposure on the Concentration of 3-alkyl-2-methoxypyrazines and Other Key Constituents of Wine" Brock University, St. Catharines, Ontario, 2009.
Wine Australia, Australian Government, "Bulk Wine Loading Procedure" 5 pages.
S. Easton, "Packaging Formats, Recycling and Improving Sustainability" Wine Wisdom, May 16, 2009, 5 pages.
Caniel Beverage Packaging, "Packaging Soft Drinks and Reconstituted Juices in Beverage Cans" 2002, 25 pages.
T. Patterson, "Inquiring Winemaker—Carbon Dioxide in Wine: It's a Gas!" Wines & Vines, May 2011, 3 pages.
M. Reeves, "Packaging and the Shelf Life of Wine" Faculty of Science and Technology, Eastern Institute of Technology, Taradale, New Zealand.
H. Pyle, "CalNaturale" Chardonnay, Haiku Vineyard, Hopland, CA.
F. Church, "Next Aluminum Target: Cans for Wine, Water, Juices".
Chart Inc., "Liquid Nitrogen Dosing: Application Focus".
B. Zoecklein, "Enology Notes: vol. 65, Dec. 6, 2002" Wine/Enology—Grape Chemistry Group, Virginia Tech.
B. Zoecklein, "Enology Notes: vol. 122, Dec. 20, 2006" Wine/Enology—Grape Chemistry Group, Virginia Tech.
J. C. Vidal, et al., Monitoring of Oxygen in the Gas and Liquid Phases of Bottles of Wine at Bottling and During Storage, Vigne et Vin Publications Internationales, Bordeaux, France.
Scott Laboratories, "Separation Anxiety—Observational Insights to Making Filtration Day Easier" 44 pages.
Hanna Instruments "Measuring Dissolved Oxygen in Wine" 31 pages.
ETS Laboratories, "Molecular SO2 Now Reported When Free SO2 and PH are Both Analyzed" Technical Bulletin, Jan. 20, 2011.
V. O'Brien, et al., "Managing Oxygen Ingress at Bottling" Wine Industry Journal, Wine Presentation, Jan./Feb. 2009, vol. 24, No. 1.
R. Ferrarini, et al., "The Packaging of Wine in Aluminium Containers" Vinegrowing and Winemaking Research, 14 pages.
J. Robinson, "The Oxford Companion to Wine" Oxford University Press, 2006, 5 pages.
Scorpex Wine Services, Report by Richard Gibson, Barokes Pty Ltd, Sep. 15, 2011.
T. Stelzer, "Taming the Screw: A Manual for Winemaking with Screw Caps".
R. Gahagan, et al., "Required Analytical Tests for Wineries" Department of the Treasury Bureau of Alcohol, Tobacco & Firearm, 42 pages.
R. W. Revie, "Uhlig's Corrosion Handbook" The Electrochemical Society Series, John Wiley & Sons, Inc., 2011.
D. Bird, "Understanding Wine Technology: A Book for the Non-Scientist That Explains the Science of Winemaking" 2010.
C. Butzke, "Use of SO2 in High-pH Wines" Purdue University, Purdue Extension, Commerical Winemaking Production Series, 3 pages.
M. Dharmadhikari, "Use of Insert Gases" 4 pages.
Advantec MFS, Inc., "Wine Filtration Products" 6 pages.
B. Zoecklein, et al., Wine Analysis and Production.
M. Parish, et al., "Managing Brett" 6 pages.
M. Cano-López et al., "E. Effect of Micro-Oxygenation on Color and Anthocyanin-Related Compounds of Wines with Different Phenolic Contents" Journal of Agricultural and Food Chemistry; vol. 56, No. 14, Jun. 18, 2008; pp. 5932-5941.

\* cited by examiner

CONTROLLING PRODUCTION OF H₂S IN BEVERAGES FOR PACKING IN ALUMINUM CONTAINING PACKAGES

CROSS-REFERENCE TO RELATED APPLICATIONS

This Application is a United States National Stage Application under 35 U.S.C. Section 371 of International Patent Application No. PCT/US2019/064178 filed on Dec. 3, 2019, which is hereby incorporated by reference as if fully set forth herein. This Application also claims priority to and the benefit of U.S. Provisional Application No. 62/774,642, filed Dec. 3, 2018, which is also hereby incorporated by reference as if fully set forth herein.

FEDERALLY SPONSORED RESEARCH OR DEVELOPMENT

N/A

TECHNICAL FIELD

The invention generally relates to storing beverages in aluminum containers; more particularly this invention relates to controlling hydrogen sulfide production in acidic beverages containing sulfur dioxide and stored in aluminum containers.

BACKGROUND OF THE INVENTION

For some time and with mixed success, beverage makers have attempted to store and market fermented beverages, such as wine and cider, in aluminum-based containers, typically the popular two-piece, stay-on tab aluminum beverage cans produced by the billions each year. The mixed results are often attributed to an undesirable taste of the beverage stored within the containers. It is believed that one cause of the undesirable taste is an aroma of hydrogen sulfide produced by acid corroding the aluminum container in the presence of sulfur dioxide.

For example, a typical wine has a pH range of 3 to 4 while beer has a pH typically less than 5. Carbonated soft drinks also have a pH less than 5. Therefore, pH range alone may not account for a deterioration of the taste of a beverage stored in an aluminum container.

Use of sulfur dioxide is widely accepted in the art of winemaking. It is used as a preservative due to its anti-oxidative and anti-microbial properties in wine and a cleaning agent for barrels and winery facilities.

Hydrogen sulfide is known as having an objectionable "rotten egg" odor which is highly undesirable among the wine-consuming public. One approach to addressing the production of hydrogen sulfides in wine is to coat the interior walls of the aluminum container with a thicker than normal coating. Application of coatings on the interior walls of aluminum beverage containers is well known in the art. However, it has been theorized that thicker or heavier coatings scalp flavors from beverages.

The present invention is provided to solve the problems discussed above and other problems, and to provide advantages and aspects not provided by prior aluminum packaging of this type. A full discussion of the features and advantages of the present invention is deferred to the following detailed description, which proceeds with reference to the accompanying drawings.

SUMMARY OF THE INVENTION

A first method of packaging a fermented beverage in an aluminum-bearing container comprises the step of decreasing the concentration of sulfur dioxide in the fermented beverage, optionally by subjecting the fermented beverage to a chemical process.

The first method may include one or more of the following steps and features, alone or in any reasonable combination. The step of decreasing the concentration of sulfur dioxide may be performed prior to a step of introducing the fermented beverage into the aluminum-bearing container. The step of decreasing the concentration of sulfur dioxide may be performed after the step of introducing the fermented beverage into the aluminum-bearing container. The chemical process may be a batch process. The chemical process may be performed in-line to a fluid flow of the fermented beverage. The chemical process may comprise micro-oxygenation. The chemical process may comprise an addition of hydrogen peroxide to the fermented beverage. The chemical process may comprise exposing the fermented beverage to an aldehyde-containing material. The chemical process may comprise introducing the fermented beverage into the aluminum-bearing container wherein the aluminum-bearing container comprises an aldehyde-containing material on an interior surface thereof in contact with the fermented beverage. A pH of the fermented beverage may be increased. A pH of the fermented beverage may be greater than or equal to 3.5 wherein an amount of molecular sulfur dioxide is decreased and a chemical solution of a system defined by the fermented beverage within an aluminum-bearing container is altered wherein the pH is such that an aluminum of the aluminum-bearing container is at least partially passivated and not prone to corrosion. The method may further comprise the step of adding an antioxidant to the fermented beverage. The chemical process may comprise adding one or more phenolics, including nonflavonoids, such as hydroxycinnamates, benzoic acids, hydrolysable tannins, stilbenes (resveratrol), and/or flavonoids, such as anthocyanins, proanthocyanidins and condensed tannins, among others, and/or aldehydes to the beverage. The one or more phenolics and aldehydes may be chosen from the group consisting of resveratrol and acetaldehyde. The method may further comprise a step of exposing the fermented beverage to oxygen wherein the oxygen initiates oxidation processes (some indirect or through intermediary radicals) that can end with ethanol being oxidized to acetaldehyde that reacts with $SO_2$, decreasing its concentration. The oxygen may react with a quantity of the sulfur dioxide greater than a quantity of the oxygen added to the fermented beverage. A concentration of oxygen added to the fermented beverage may be at least four times greater than a concentration of sulfur dioxide within the fermented beverage prior to adding oxygen to the fermented beverage. The chemical process may include the step of oxidizing ethanol to form acetaldehyde, which is then bound by sulfur dioxide. A concentration of molecular sulfur dioxide may be less than 0.4 mg/L.

A second method of the present invention is directed to preparing a fermented beverage for packaging in an aluminum-bearing container. The method comprises the step of decreasing a concentration of sulfur dioxide in the fermented beverage via chemical reaction.

The second method may comprise any of the following features or steps, along or in any reasonable combination. A pH of the fermented beverage may be increased. A pH of the fermented beverage may be greater than or equal to 3.5 wherein an amount of molecular sulfur dioxide is decreased and a chemical solution of a system defined by the fermented beverage within an aluminum-bearing container is altered wherein the pH is such that an aluminum of an aluminum-bearing container is at least partially passivated and not prone to corrosion. The method may further comprise the step of exposing the fermented beverage to an aldehyde. The method may further comprise the step of adding an antioxidant to the fermented beverage. The method may further comprise the step of adding one or more phenolics including nonflavonoids, such as hydroxycinnamates, benzoic acids, hydrolysable tannins, stilbenes (resveratrol), and/or flavonoids, such as anthocyanins, proanthocyanidins and condensed tannins, among others, and aldehydes to the fermented beverage. The one or more phenolics and aldehydes may be chosen from the group consisting of resveratrol and acetaldehyde. The method may further comprise the step of decreasing a concentration of sulfur dioxide within the fermented beverage prior to a step of introducing the fermented beverage into the aluminum-bearing container. The method may further comprise the step of decreasing a concentration of sulfur dioxide in the fermented beverage after a step of introducing the fermented beverage into the aluminum-bearing container. The method may further comprise the step of introducing oxygen into the fermented beverage through micro-oxygenation. The method may further comprise the step of adding a hydrogen peroxide to the fermented beverage. The method may further comprise the step of exposing the fermented beverage to an aldehyde-containing material. The method may further comprise the step of introducing the fermented beverage into the aluminum-bearing container wherein the aluminum-bearing container comprises an aldehyde-containing material on an interior surface thereof in contact with the fermented beverage. A concentration of molecular sulfur dioxide may be less than 0.4 mg/L.

A fermented beverage packaging of the present invention comprises a container comprising an aluminum and forming a substantially fluid-tight enclosure; a fermented beverage within the enclosure; and an antioxidant within the enclosure.

The fermented beverage packaging of the present invention may include one or more of the following features, alone or in any reasonable combination. The fermented beverage may have a concentration of molecular sulfur dioxide less than 0.4 mg/L. The fermented beverage may have been exposed to an aldehyde-containing material within the enclosure. The aldehyde-containing material may be a component of a coating on an interior surface of the enclosure. A pH of the fermented beverage may be greater than or equal to 3.5 wherein the pH is such that the aluminum of the container is at least partially passivated and not prone to corrosion. The antioxidant may comprise one or more phenolics. The one or more phenolics may comprise resveratrol. Oxygen may be added to the fermented beverage, and a concentration of the oxygen added to the fermented beverage may be greater than a concentration of sulfur dioxide within the fermented beverage. The fermented beverage may be subjected to a chemical process, wherein the chemical process includes oxidization of ethanol to form acetaldehyde, which is then bound by $SO_2$. A presence of the antioxidant may allow a concentration of sulfur dioxide in the fermented beverage to be decreased.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

Figure 1:
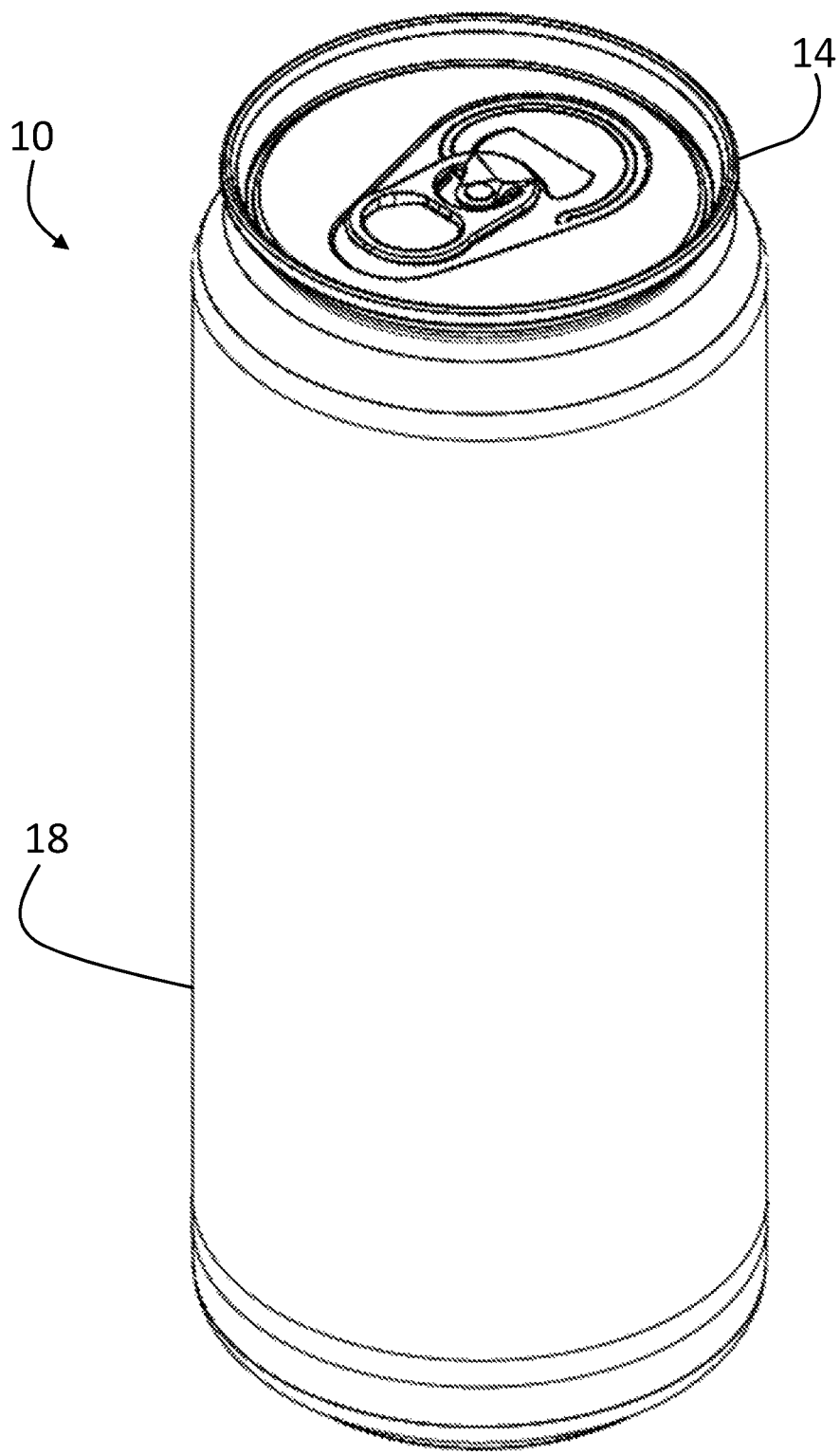
FIG. 1 is a perspective view of an aluminum-bearing container filled with a fermented beverage.
Figure 2:
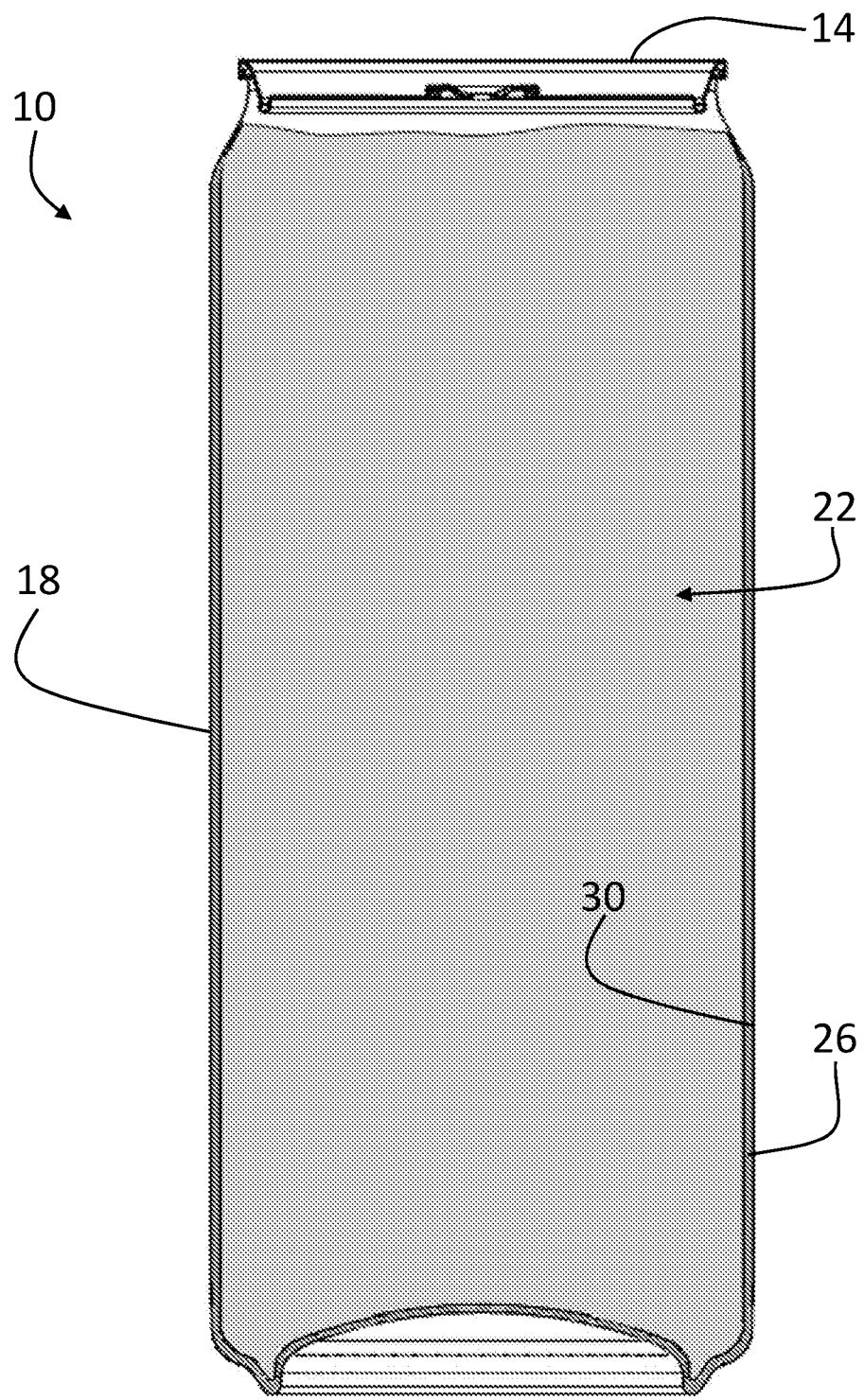
FIG. 2 is a cross-sectional view of the aluminum-bearing container of FIG. 1.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The inventors believe that an acidic beverage containing sulfur dioxide ($SO_2$) containing beverages in the presence of metallic aluminum (container body and lid, foil, liner) produces hydrogen sulfide ($H_2S$), which is objectionable to consumers of the beverages. The methods described herein are aimed at decreasing or eliminating this process, preserving the beverage, and improving consumer acceptance.

The present invention addresses the problem of sulfide production in acidic, $SO_2$-containing beverages, such as fermented wines and ciders in aluminum containing packages.

The mechanism of the problem was discovered to be acid protons and naturally occurring or added sulfur dioxide permeating a barrier coating on the aluminum such as in a can body, or a plastic-foil laminate such as a roll on a pilfer-proof (ROPP) closure cap liner or bag-in-box pouch or paper, or cardboard carton. The protons cause corrosion of the aluminum solid, Al (s), to aluminum (III), an oxidation state 3+ ($Al^{3+}$), which generates electrons that chemically reduce the $SO_2$ to $H_2S$, which is responsible for rotten egg type aromas. An aspect of the present invention is associated with understanding this mechanism and limiting the undesirable reaction through the limit or control of $SO_2$.

Generally, the invention includes lowering molecular $SO_2$ via various means: decreasing $SO_2$ use/free $SO_2$ additions; increasing beverage pH which decreases concentration of molecular $SO_2$; adding hydrogen peroxide $H_2O_2$ which oxidizes $SO_2$ to sulfurous acid ($H_2SO_4$):

$$SO_2 + H_2O_2 \rightarrow H_2SO_4;$$

and using micro-oxygenation, or otherwise adding oxygen ($O_2$) to decrease $SO_2$ (usually through oxidizing ethanol to form acetaldehyde, which is then bound by $SO_2$); using/adding phenolics and aldehydes, e.g. additives and/or container coating types to lower $SO_2$; and adding antioxidant to lower $SO_2$ to potentially permit less use of $SO_2$ for a similar antioxidant purpose. $SO_2$ added to wine, either as dissolved $SO_2$ gas, or as various salts such as potassium metabisulfite ($K_2S_2O_5$) or sodium bisulfite ($N_2S_2O_5$), dissociates into $SO_2$. This is molecular $SO_2$. $HSO_3^-$ (bisulfite), and $SO_3(2-)$ (sulfite), these species comprise the free $SO_2$, and the amounts of each are dependent on the pH. Each of these species are reactive to specific chemistries. If reacted/bound, they become bound $SO_2$. Total $SO_2$ is the sum of free species and bound $SO_2$.

Acetaldehyde ($CH_3$—CHO) concentration in a newly fermented wine is typically less than 75 mg/L.

$$CH_3\text{—}CHO + HSO_3^- \rightarrow CH_3\text{—}CHOH\text{—}SO_3^-$$

Each milligram of acetaldehyde will bind with 1.45 milligrams of $SO_2$ to form acetaldehyde-alpha-hydroxy sulphonate.

Adding aldehydes in a coating could actively bind $SO_2$ that permeates the coating.

Phenolics are different than aldehydes and tend to act as antioxidants. Its inclusion is believed to permit a winemaker to use less $SO_2$ for the same or similar effect.

In one embodiment, a beverage 22 is treated prior to packaging in an aluminum vessel 10 to decrease concentration of $SO_2$. The treatment comprises micro-oxygenation and/or addition of hydrogen peroxide ($H_2O_2$) in an in-line or batch process prior to seaming a can end 14 to a filled can body 18.

In one embodiment, the beverage 22 is treated to decrease concentration of $SO_2$ during or in packaging through micro-oxygenation and/or addition of hydrogen peroxide either in-line to the aluminum container 10 or as a batch process just prior to filling and seaming a can end 14 to the aluminum can body 18.

In one embodiment, the beverage 22 is treated while within an aluminum-bearing container body 18 by introducing aldehyde containing coating materials 26 to the can body 18 interior surface 30 prior to filling.

In one embodiment, a pH of a fermented beverage 22 is increased pH>3.5 to decrease an amount of molecular $SO_2$ as well as shift a chemical solution of a system defined by the fermented beverage within an aluminum-bearing container 10 wherein the pH is such that the aluminum of the aluminum-bearing container 10 is at least partially passivated and not prone to corrosion.

The pH is increased in order to decrease the molecular $SO_2$ concentration, but it does not necessarily have to be greater than or equal to pH 3.5. Any pH increase will decrease existing molecular $SO_2$ concentration and likely improve passivity of the Al. A pH of 3.5 or above is the preferred pH.

In one embodiment, the concentration of molecular sulfur dioxide is less than 0.4 mg/L.

It is believed that decreasing sulfur dioxide concentration and/or increasing pH of the fermented beverage decreases molecular sulfur dioxide, while increasing pH decreases molecular sulfur dioxide and increases aluminum passivation/resistance to corrosion. All of which combine to decrease hydrogen sulfide formation in sulfur dioxide-containing products exposed to aluminum.

Each of these embodiments may be batch processes prior to filling and enclosing a beverage 22 within an aluminum-bearing container, in-line, or within the aluminum container 10.

One method of the invention includes decreasing $SO_2$ concentration prior to packaging through an oxygen addition. This may include micro-oxygenation and/or addition of hydrogen peroxide as an in-line or batch process.

One method of the present invention may include decreasing $SO_2$ concentration during/in packaging through an oxygen addition. This includes micro-oxygenation and/or addition of hydrogen peroxide either in-line to packaging or as a batch process just prior to packaging.

One method of the present invention includes decreasing $SO_2$ concentration during/in packaging through an oxygen addition during and through a process of filling the packaging by encouraging exposure of a fermented beverage to oxygen. Dissolved oxygen (DO) concentration in still wine generally increases by about 0.5 mg/L during bottling under ideal, industry best practice conditions (1.0-1.5 mg/L under less ideal conditions). Although packaging carbonated wines/spritzers etc., it is possible to decrease/maintain DO concentration below 0.1 mg/L. Theoretically, 1.0 mg/L of oxygen can react with 4 mg/L of $SO_2$ to produce acetaldehyde. Thus, the process of bottling or canning a fermented beverage can also decrease concentration of $SO_2$.

One method includes the step of decreasing $SO_2$ concentration through an addition of a quantity of phenolics (e.g. resveratrol) or aldehydes (e.g. acetaldehyde) chemical agents or via a packaging containing materials such as aldehyde containing epoxies, e.g. formaldehyde or acetaldehyde. The phenolics may include nonflavonoids, such as hydroxycinnamates, benzoic acids, hydrolysable tannins, stilbenes (resveratrol), and/or flavonoids, such as anthocyanins, proanthocyanidins and condensed tannins, among others, and/or aldehydes. Antioxidants do not directly react with and decrease $SO_2$ concentration, but their use is believed to permit the winemaker to decrease his/her addition of $SO_2$ for the same or similar effect.

One method includes decreasing $SO_2$ concentration by increasing pH. In one illustrative example, pH is increased to greater than 3.5. Increasing pH, decreases molecular $SO_2$ concentration relative to other $SO_2$ forms. Increasing pH also improves the corrosion resistance of aluminum.

One method includes the step of adding an antioxidant, for example resveratrol, to decrease the need for $SO_2$, thus allowing the beverage producer/handler to decrease a concentration of $SO_2$ added to a beverage.

ILLUSTRATIVE EXAMPLES

The present invention describes methods for controlling the production of $H_2S$ in beverages that are filled in aluminum containing packages. It describes beverage product and process modifications before, during or just after filling to reduce or prevent $H_2S$ formation. The following examples support a chemical reaction mechanism. Also, modification of the chemistry as outlined can protect the product.

This development applies to $SO_2$ and acid containing beverages common in products like fermented beverages such as wines and ciders and is aimed at defining ways that such beverage products can be modified just before, during or just after filling into an aluminum container to reduce the propensity for $H_2S$ formulation.

Experiments were conducted to test efficacy of the principles of the invention. In these tests, 6 mm sized aluminum disks were subjected to various wine environments. The data presented below show average $H_2S$ concentrations in various wines (a model wine, red wine, and white wine) at various pH and $SO_2$ concentrations after 14 days at 50° C. $SO_2$ concentrations above a few ppm yielded $H_2S$ at concentrations greater than a sensory threshold, regardless whether $SO_2$ was added or was decreased in the sample by volatilizing the $SO_2$ through aeration or sparging the wine with a fluid, namely air or nitrogen gas, or through addition of hydrogen peroxide. Red wines offer additional protection due to $SO_2$ complexing tanning and color molecules.

TABLE 1

Average $H_2S$ concentrations in a model white wine (10% ethanol, 5 g/L potassium bitartrate) at pH 3.00 with a 6 mm Al disk after 14 days at 50° C.

| Free SO2 (mg/L) | pH | H2S (µg/L) |
|---|---|---|
| 0 | 3.0 | 0.0 |
| 3 | 3.0 | 0.0 |
| 10 | 3.0 | 0.0 |

TABLE 1-continued

Average H$_2$S concentrations in a model white wine (10% ethanol, 5 g/L potassium bitartrate) at pH 3.00 with a 6 mm Al disk after 14 days at 50° C.

| Free SO2 (mg/L) | pH | H2S (µg/L) |
|---|---|---|
| 17 | 3.0 | 11.7 |
| 25 | 3.0 | 24.6 |
| 29 | 3.0 | 27.5 |

TABLE 2

Red wine at constant 0.8 molecular SO$_2$ with 6 mm Al disk, yields decreasing H$_2$S with increasing pH

| Free SO2 (mg/L) | pH | H2S (µg/L) |
|---|---|---|
| 8 | 2.8 | 10.3 |
| 13 | 3.0 | 6.1 |
| 40 | 3.5 | 0.6 |

TABLE 3

In white wines with 6 mm Al disk, adjusting pH and or SO$_2$ can have a significant impact, above pH 3.5 and molecular SO$_2$ less than 0.1 reduce H$_2$S to below threshold levels.

| Free SO2 (mg/L) | pH | H2S (µg/L) |
|---|---|---|
| 0 | 3.6 | 0.0 |
| 3 | 3.5 | 0.5 |
| 10 | 3.2 | 21.2 |
| 15 | 3.4 | 16.1 |
| 19 | 3.3 | 30.0 |

While the specific embodiments have been illustrated and described, numerous modifications come to mind without significantly departing from the spirit of the invention, and the scope of protection is only limited by the scope of the accompanying Claims.

What is claimed is:

1. A method of packaging a fermented beverage in an aluminum-bearing container, comprising the step of:
decreasing a concentration of molecular sulfur dioxide in the fermented beverage to a concentration of molecular sulfur dioxide less than 0.4 mg/L during packaging of the fermented beverage in the aluminum-bearing container, via chemical process, wherein the chemical process comprises micro-oxygenation performed during packaging of the fermented beverage in the aluminum-bearing container,
wherein the fermented beverage is a white wine.

2. The method of claim 1 wherein the step of decreasing the concentration of sulfur dioxide is performed prior to a step of introducing the fermented beverage into the aluminum-bearing container.

3. The method of claim 1 wherein the step of decreasing the concentration of sulfur dioxide is performed after the step of introducing the fermented beverage into the aluminum-bearing container.

4. The method of claim 1 wherein the chemical process is a batch process.

5. The method of claim 1 wherein the chemical process is performed in-line to a fluid flow of the fermented beverage.

6. The method of claim 1 wherein the chemical process comprises an addition of hydrogen peroxide to the fermented beverage.

7. The method of claim 1 wherein the chemical process comprises exposing the fermented beverage to an aldehyde-containing material.

8. The method of claim 1 wherein the chemical process comprises introducing the fermented beverage into the aluminum-bearing container wherein the aluminum-bearing container comprises an aldehyde-containing material on an interior surface thereof in contact with the fermented beverage.

9. The method of claim 1 wherein the chemical process comprises adding an antioxidant to the fermented beverage.

10. The method of claim 9 wherein the antioxidant comprises one or more phenolics.

11. The method of claim 10 wherein the one or more phenolics is resveratrol.

12. The method of claim 1 wherein the chemical process comprises adding an aldehyde to the fermented beverage.

13. The method of claim 12 wherein the aldehyde comprises acetaldehyde.

14. The method of claim 1 wherein the chemical process includes the step of oxidizing ethanol to form acetaldehyde, which is then bound by SO$_2$.

15. The method of claim 1 wherein the chemical process comprises increasing a pH of the fermented beverage to decrease a concentration of molecular sulfur dioxide and increase aluminum passivation/resistance to corrosion to decrease hydrogen sulfide formation in the fermented beverage exposed to an aluminum in the aluminum-bearing container.

16. The method of claim 1 further comprising the step of increasing a pH of the fermented beverage.

17. The method of claim 1 wherein a pH of the fermented beverage is greater than or equal to 3.5 wherein an amount of molecular sulfur dioxide is decreased and a chemical solution of a system defined by the fermented beverage within an aluminum-bearing container is altered wherein the pH is such that an aluminum of aluminum-bearing container is at least partially passivated and not prone to corrosion.

18. The method of claim 1 comprising exposing the fermented beverage to oxygen wherein the oxygen reacts with ethanol and oxidizes ethanol to form acetaldehyde and wherein the acetaldehyde further reacts with sulfur dioxide.

19. The method of claim 18 wherein the oxygen consumes a quantity of the sulfur dioxide greater than a quantity of the oxygen added to the fermented beverage.

20. The method of claim 19 wherein a concentration of oxygen added to the fermented beverage is greater than a concentration of sulfur dioxide within the fermented beverage.

21. The method of claim 1 wherein exposure to oxygen during a filling of the aluminum-bearing container with the white wine increases a dissolved oxygen concentration in the wine.

22. A method of packaging a fermented beverage in an aluminum-bearing container, wherein the fermented beverage is chosen from the group consisting of wine and cider, comprising the step of:
decreasing a concentration of molecular sulfur dioxide in the fermented beverage to a concentration of molecular sulfur dioxide less than 0.4 mg/L during packaging of the fermented beverage in the aluminum-bearing container, via chemical process, wherein the chemical process comprises micro-oxygenation performed during packaging of the fermented beverage in the aluminum-bearing container, wherein exposure to oxygen during a filling of the aluminum-bearing container with the fermented beverage increases a dissolved oxygen concentration in the fermented beverage by 0.5 mg/L.

\* \* \* \* \*